US011178123B2

(12) United States Patent
Soryal et al.

(10) Patent No.: US 11,178,123 B2
(45) Date of Patent: Nov. 16, 2021

(54) VIDEO COMMUNICATION DATA SECURITY

(71) Applicant: AT&T Intellectual Property I, L.P., Atlanta, GA (US)

(72) Inventors: Joseph Soryal, Ridgewood, NJ (US); Naila Jaoude, Eatontown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/584,670

(22) Filed: Sep. 26, 2019

(65) Prior Publication Data
US 2021/0099433 A1 Apr. 1, 2021

(51) Int. Cl.
| | |
|---|---|
| *H04N 19/17* | (2014.01) |
| *H04L 29/06* | (2006.01) |
| *H04L 9/08* | (2006.01) |
| *H04N 21/845* | (2011.01) |
| *H04L 9/14* | (2006.01) |

(52) U.S. Cl.
CPC ........ *H04L 63/0478* (2013.01); *H04L 9/0822* (2013.01); *H04L 9/14* (2013.01); *H04L 63/0485* (2013.01); *H04N 21/8456* (2013.01)

(58) Field of Classification Search
CPC ............ G06F 21/10; G06F 2221/0724; H04L 63/0428; H04N 19/00; H04N 19/17; H04N 19/467; H04N 21/234318; H04N 21/2347; H04N 21/26613; H04N 21/4627; H04N 21/631; H04N 7/16
See application file for complete search history.

(56) References Cited

U.S. PATENT DOCUMENTS

| | | | |
|---|---|---|---|
| 8,140,857 B2 | 3/2012 | Forlenza et al. | |
| 9,396,310 B2 | 7/2016 | de los Reyes et al. | |
| 9,990,513 B2 | 6/2018 | Ghafourifar | |
| 2014/0201527 A1* | 7/2014 | Krivorot | G06F 21/6209 713/168 |
| 2018/0189461 A1* | 7/2018 | Ghafourifar | H04N 21/2347 |

OTHER PUBLICATIONS

Ra, Moo-Ryong & Govindan, Ramesh & Ortega, Antonio. (2013). P3: Toward Privacy-Preserving Photo Sharing. Feb. 2013; 14 pages. https://www.researchgate.net/publication/235656938_P3_Toward_Privacy-Preserving_Photo_Sharing.

* cited by examiner

*Primary Examiner* — Olugbenga O Idowu (57) ABSTRACT

A processing system including at least one processor may obtain a portion of a video stream, identify a first region of the portion of the video stream that contains a first item that is designated for obscuring, replace the first item in the first region of the portion of the video stream with an obscured version of the first item, and encrypt the portion of the video stream with a first encryption key. The processing system may further generate an executable package comprising the first item in the first region of the portion of the video, where the executable package is encrypted with a second encryption key, and transmit the portion of the video stream that is encrypted with the first encryption key and the executable package that is encrypted with the second encryption key to a recipient device.

20 Claims, 4 Drawing Sheets

VIDEO COMMUNICATION DATA SECURITY

The present disclosure relates generally to video communication sessions, and more particularly to methods, computer-readable media, and apparatuses for obscuring an item in a video stream that is encrypted with a first encryption key and generating an executable package comprising the item that is encrypted with a second encryption key.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and apparatus for obscuring an item in a video stream that is encrypted with a first encryption key and generating an executable package comprising the item that is encrypted with a second encryption key. For example, a processing system including at least one processor may obtain a portion of a video stream, identify a first region of the portion of the video stream that contains a first item that is designated for obscuring, replace the first item in the first region of the portion of the video stream with an obscured version of the first item, and encrypt the portion of the video stream with a first encryption key. The processing system may further generate an executable package comprising the first item in the first region of the portion of the video, where the executable package is encrypted with a second encryption key, and transmit the portion of the video stream that is encrypted with the first encryption key and the executable package that is encrypted with the second encryption key to a recipient device.

Examples of the present disclosure identify and obscure sensitive visual information, such as biometric features, during video communication. The present examples may relate to visual communications that include video chat, shared augmented reality experiences, security and premises monitoring feeds, biometric authentication-based access systems, such as systems where access is obtained via an eye scan, and so forth. In one example, the present disclosure may identify sensitive aspects in a video, e.g., sensitive items, such as biometric features, private documents, etc., and may encrypt those portions in one or more separate tunnels associated with the video stream. The separate tunnel(s) may be transmitted within a tunnel used for the overall video, or may be transmitted as an independent tunnel. In addition, the sensitive portion(s) of the video may be obscured in one or more ways, such as blurring, silhouetting, omitting, replacing with a placeholder, and so on. If the video stream is intercepted in transit between the source and a destination/intended recipient, the biometric or other sensitive features that are encrypted will remain unavailable, while the associated portion of the video that may be obtained by the attacker will only comprise non-sensitive visual information, such as an obscured, pixelated, or blurred image that does not have the exact personally-identifiable features of a person, a document that does not have legible letters or words, etc. On the other hand, at the intended recipient device, the separately encrypted biometric features (or other sensitive features) may be decrypted and the true and correct imagery may be presented in the appropriate spatial and temporal position within the video. In particular, the intended recipient device may use the decrypted, true version of the imagery of the sensitive feature(s) instead of the obscured version that may be part of the general video stream.

In one example, the separately encrypted sensitive features may be encrypted and sent to the intended recipient device as an executable package. In one example, the executable package may include a timer embedded in the code that will cause the intended recipient device to obscure the sensitive portions of the video after a short period of time (e.g., enough time to reach the destination and be rendered and displayed). Thus, the actual receiver will be able to present a clear image, but it will be short lived. In one example, the period before obscuring the image at the destination may be determined by sending probe packets from the source to estimate the approximate time needed for actual delivery to the destination. In addition, an allowance for processing time at the recipient device may be added (e.g., 500 ms for network transit as determined via one or more probe packets plus 200 ms to allow for buffering and/or any other destination device processing before rendering and display). In one example, the duration of the countdown timer may be adjusted on a regular basis by continuing to send one or more probe packets.

In one example, the present disclosure may include a sender-side application via which items in a video can be marked private, or "PREO" (private—receiver's eyes only). For instance, a user can select items, which may include shapes, areas, faces, or physical objects to be marked private. Alternatively, or in addition, a machine learning (ML) module may recommend aspects to be marked private based on the user's own history and/or based on behavior of other users of the system. In one example, the user may be presented with options to agree with the ML-generated recommendations or not. In one example, the items marked private may be separately packaged from the main portion of the video (e.g., the bits may be logically isolated from the general video stream by a certain sequence of bits before and after). For instance, the private portions may be segregated from the remainder of a frame, group of pictures (GoP), or a chunk of the video. An executable package comprising the sensitive regions of the video may then have special localized encryption inside the video stream (which in one example is also encrypted as a whole with a different encryption key).

In one example, when the executable package with one or more sensitive aspects of the video is created, the present disclosure may also alter the portion of the video to include obscured version(s) of any of the sensitive items. The video containing this these blurred/altered versions of sensitive items may be decryptable with the encryption key(s) for the whole video stream. For instance, during a conference call, the participant's eye color or details can be replaced with more generic eye images (which may still be related to the original characteristics, but altered) to keep unnecessary information from being shared with some or all of the other participants. It should be noted that the encrypted executable package may be sent to another user (e.g., in the case of video games, augmented reality, video conferencing, etc.) or may be sent to an automated authentication server (e.g., for biometric authentication and/or authorization).

As noted above, the separately encrypted package containing the actual/original image(s) of the sensitive item(s) may comprise an executable package. For instance, the executable package may include a count-down timer that may start counting down once the intended recipient device decrypts the package with the special encryption key for the items marked private. Alternatively, the count-down timer may begin counting down upon transmission from the source device. To illustrate, once the package is decrypted by the destination device, clear original image(s) of the sensitive item(s) may be presented until the timer expires. Thereafter, the image(s) may be obscured via a mutable intelligent code embedded in the package. For example, the code may cause the destination device to release or overwrite the decrypted image(s) of the sensitive item(s). Any version of the video that may be retained in memory and/or storage of the intended recipient device may contain the obscured version(s) of the sensitive item(s). Thus, the count-down timer may provide only enough time for the package to reach the intended destination intact and to be watched/seen by the intended recipient. After the expiration, the destination device may blur or otherwise obscure the image(s) by altering the bits. For instance, the destination device may maintain a copy of the video in the form in which it is received as part of the main video stream, i.e., with the obscured version(s) of the sensitive item(s).

In one example, each sensitive item may be protected via a separate encryption key that is shared between the sender and the intended recipient device. In one example, a set of keys may be shared/negotiated at the beginning of a communication session. For instance, this set of keys may be different from a key (or a set of keys) that is used to encrypt the general video stream (e.g., the "main" or primary tunnel). In one example, for multiple sensitive items in a given portion of the video (e.g., a frame, a GoP, or a chunk) the separately encrypted items may be transmitted as a single executable package. In another example, each separately encrypted item may be transmitted to the recipient device as a separate executable package. In one example, the one or more executable packages may be secondarily encrypted within a main/primary tunnel for the video communication. In another example, the one or more executable packages may be sent separately from the rest of the video in a second tunnel that is different from the main primary tunnel. In one example, each executable package may use a different encryption key, even if being used for the same object (e.g., eyes), as long as the encryption key is identified by a sequence number identifying the particular encryption key within a set of encryption keys that are known to the destination device.

In one example, an executable package may be decrypted in two steps by a decoder of a destination device. For instance, the decoder may first provide its own time stamp in order to run the executable package. If the time stamp of the decoder minus the time stamp of the sender is greater than the time-to-live inserted by the sender, then the decoder may prevent the opening of the executable package. In addition, the decoder may cause the executable package to be released from memory and/or overwritten. In this case, the executable package may be lost forever (as intended). However, if the time stamp of the decoder minus the time stamp of the sender is less than or equal to the time-to-live inserted by the sender, then the decoder may proceed to the next step.

In particular, at the next step, the decoder may use one of the pre-shared encryption keys based on a defined sequence number to decrypt the executable package and situate those bits of the original sensitive item inside the original frame in the place of the bits for the obscured version of the sensitive item. The reconstructed original frame may be buffered in memory, and then forwarded to the graphics card of the destination device. For instance, in one example, the decoder is securely connected to a graphics processing unit (GPU) to transmit the frames of the video stream to be displayed. In one example, the decoder may periodically scan the GPU memory (and/or other elements all the way to a monitor/display) to check if any sensitive items are being stored longer than necessary (e.g., beyond buffering and queuing). For instance, the maximum duration that could be considered "necessary" may be on the order of a few hundred milliseconds when the decoder, GPU, and the display are on the same physical unit. In one example, the destination device may baseline the typical buffering duration by periodically scanning the GPU and identifying normal thresholds. If longer than normal storing/buffering time is detected, the destination device may issue an alarm and may use obscured versions of the sensitive item(s) for the remainder of the video streaming session. In addition, the destination device may instruct or request that the source device stop sending original images of sensitive items as executable packages.

In one example, the time-to-live for an executable package may be based upon latency that may be measured by the source device collecting average travel times (latency) from the source device until a frame of the video is rendered via a display of the destination device. In one example, the maximum time-to-live value may also be based upon industry standards. For instance, for Internet Protocol (IP)-based video transmission the maximum duration may be 400 ms, for a gaming stream the maximum duration may be 1000 ms, and so forth. Thus, in one example, the time-to-live for an executable package may be set to the lowest estimated latency plus 20 percent, plus 25 percent, etc., but may not exceed the maximum time specified by the standards. In other words, if the executable package exists for more time than specified in the standard, then it is acceptable to destroy the executable package (since keeping the executable package may result in connectivity/delay issues). In one example, the source device may embed a code based on these timings (or may directly indicate the timings) and if the executable package, for any reason, lives beyond that time, the decoder at the destination device may destroy the executable package. In addition, even when the time-to-live is not exceeded, the destination device may destroy the executable package and the information of the original sensitive item after the frame data is forwarded to the graphic card for display (and/or after an authentication or authorization action is completed). In one example, the decoder of the destination device may also monitor for memory tampering or manipulation, e.g., by other applications running on the device and/or via a remote connection. If any potential tampering is detected, the destination device may notify the coder at the source to stop sending sensitive items as encrypted packages.

Thus, examples of the present disclosure protect the privacy and security of users of video communication applications, systems, and services. In one example, users are enabled to control what should be kept private during online interactions. In one example, users are also provided with an automated machine learning (ML)-based tool to determine what should be made sensitive (or kept private) based on similar cases/experiences. These and other aspects of the present disclosure are described in greater detail below in connection with the examples of FIGS. 1-3.

Figure 1:
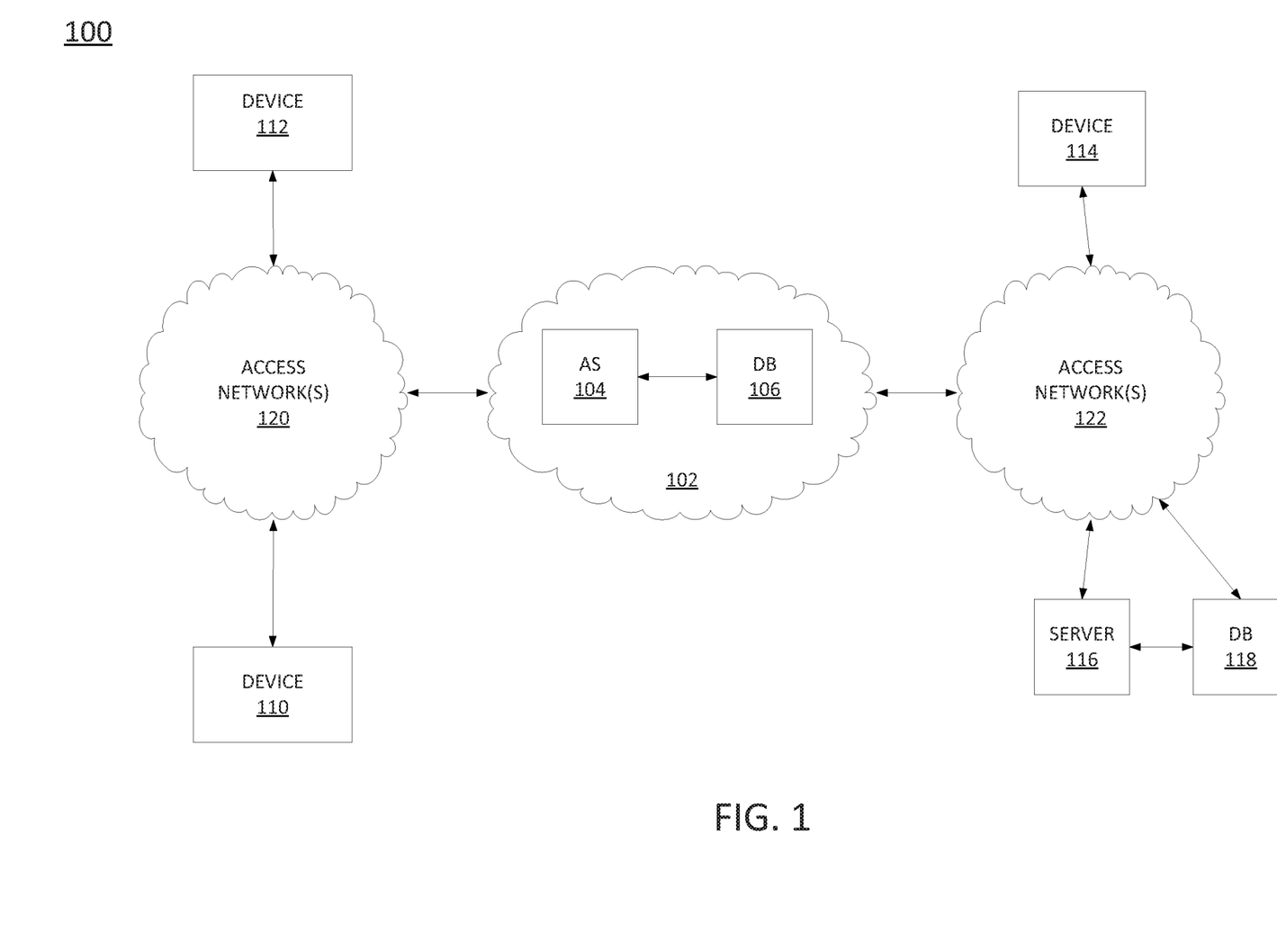
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access network 120 may be in communication with one or more devices 110 and 112. Similarly, access network 122 may be in communication with one or more devices, e.g., device 114. The access network 122 may also be in communication with a server 116 and a database (DB) 118. Access networks 120 and 122 may transmit and receive communications between devices 110, 112, and 114, between devices 110, 112, and 114 and server 116 and/or database (DB) 118, application server (AS) 104 and/or database (DB) 106, other components of network 102, devices reachable via the Internet in general, and so forth. In one example, each of the devices 110, 112, and 114 may comprise any single device or combination of devices that may comprise an endpoint device. For example, the devices 110, 112, and 114 may each comprise a mobile device, a cellular smart phone, a laptop, a tablet computer, a desktop computer, a wearable computing device, an application server, a bank or cluster of such devices, an IoT device, and the like.

Figure 3:
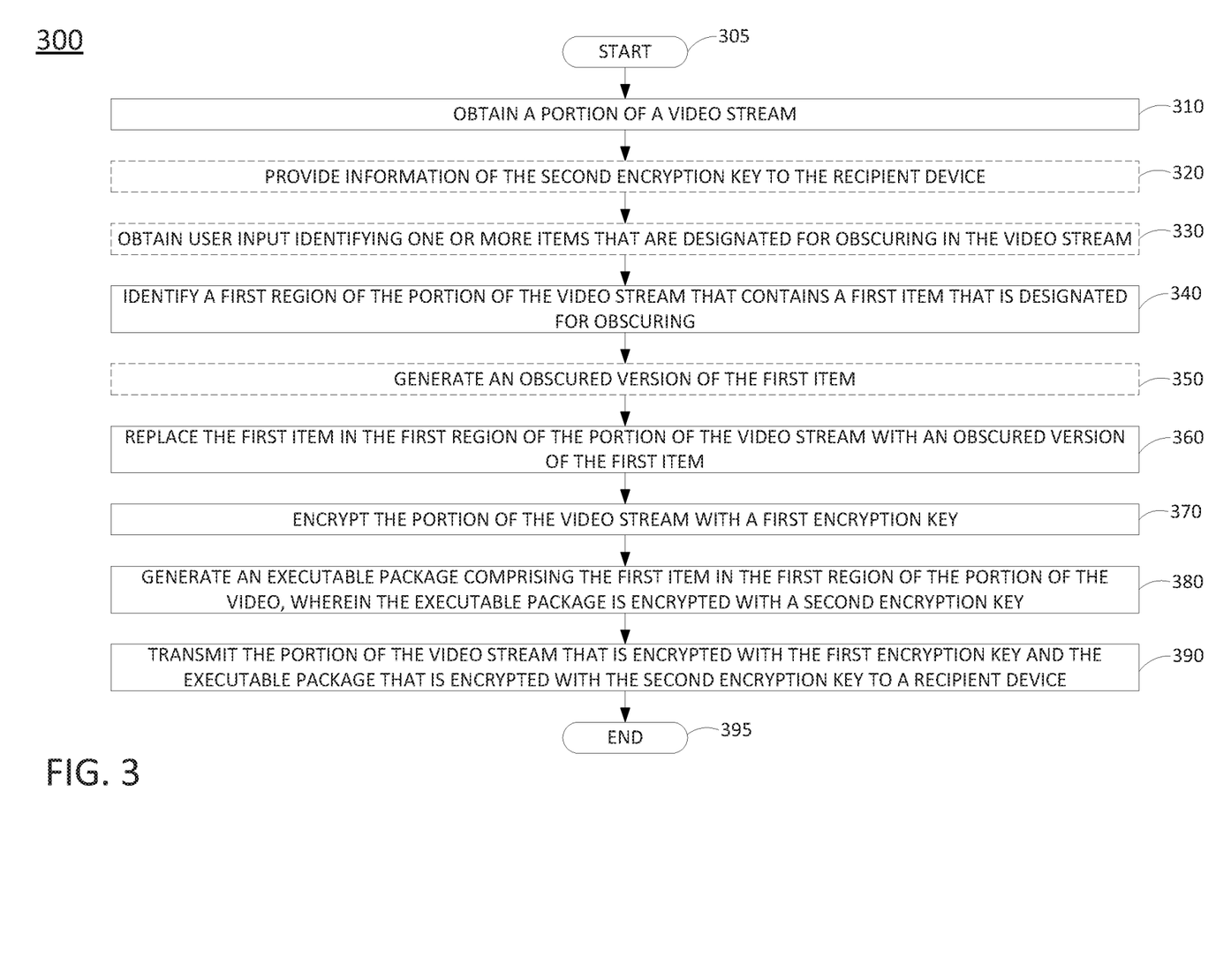
FIG. 3 illustrates a flowchart of an example method for obscuring an item in a video stream that is encrypted with a first encryption key and generating an executable package comprising the item that is encrypted with a second encryption key.

In one example, any one or more of devices 110, 112, and 114 may each comprise programs, logic or instructions for obscuring an item in a video stream that is encrypted with a first encryption key and generating an executable package comprising the item that is encrypted with a second encryption key, as described herein. For example, devices 110, 112, and/or 114 may each comprise a computing system or device, such as computing system 400 depicted in FIG. 4, and may be configured to provide one or more operations or functions for obscuring an item in a video stream that is encrypted with a first encryption key and generating an executable package comprising the item that is encrypted with a second encryption key. A flowchart of an example method for obscuring an item in a video stream that is encrypted with a first encryption key and generating an executable package comprising the item that is encrypted with a second encryption key is illustrated in FIG. 3 and discussed in greater detail below.

Figure 4:
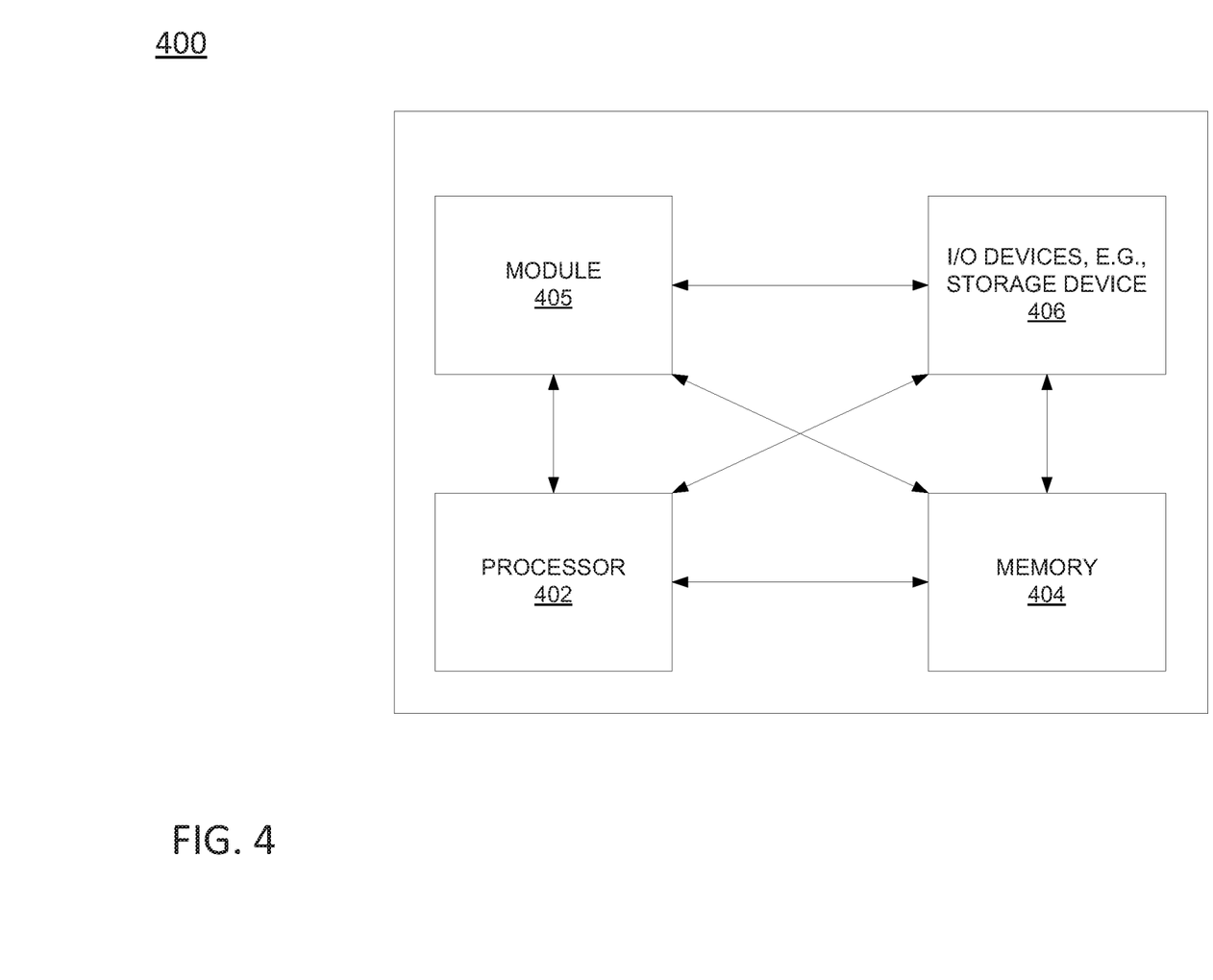
FIG. 4 illustrates a high level block diagram of a computing device specifically programmed to perform the steps, functions, blocks and/or operations described herein.

Similarly, server 116 may comprise a computing system or server, such as computing system 400 depicted in FIG. 4, and may be configured to provide one or more operations or functions in connection with examples of the present disclosure for obscuring an item in a video stream that is encrypted with a first encryption key and generating an executable package comprising the item that is encrypted with a second encryption key, as described herein. In one example, DB 118 may comprise a physical storage device integrated with server 116 (e.g., a database server), or attached or coupled to the server 116, to store various types of information. For instance, DB 118 may store biometric data or other information that may be used for user identification and/or authorization in accordance with the present disclosure. Alternatively, or in addition, DB 118 may store videos that may be received by server 116, e.g., with sensitive items obscured in accordance with the present disclosure.

In one example, AS 104 may comprise a network-based security server for receiving a video stream/feed, e.g., for premises access, for monitoring for user presence at a premises, etc. In this regard, AS 104 may comprise the same or similar components as those of server 116 and may provide the same or similar functions. Similarly, DB 106 may comprise the same or similar components as those of DB 118 and may provide the same or similar functions Thus, any examples described herein with respect to server 116 and/or DB 118 may similarly apply to AS 104 and/or DB 106, and vice versa. For instance, an operator of network 102 may provide a premises monitoring service via AS 104 that receives and processes a video feed in accordance with the present disclosure (e.g., in addition to telecommunication services such as TV, phone, internet access, etc., as described above).

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that any one of devices 110, 112, or 114 may also comprise a device of an attacker that is intent upon gaining unauthorized access to a video stream (e.g., to a video communication session). To illustrate, device 110 may comprise a security monitoring station that receives a video feed from device 114. For instance, device 114 may comprise a security camera that is directed at a location (e.g., an entrance to a building) and that may capture and stream video of the environment to the device 110. Device 110 may be used by a building security guard, for instance. In addition, in one example, device 110 may also store a copy of the video, e.g., for temporary archiving in the event that video footage may be required for a variety of purposes. In the present example, a bad actor may utilize device 112 to initiate an attack on the video stream over one or more networks and may attempt to copy the video stream, break the encryption, gain access to the raw video, steal biometric data or other sensitive information, and so forth. However, in accordance with the present disclosure, device 114 and device 110 may protect the video communication session via operations for obscuring an item in a video stream that is encrypted with a first encryption key and generating an executable package comprising the item that is encrypted with a second encryption key.

To illustrate, device 114 and device 110 may comprise a coder module/decoder module pair. These specific modules can be added to existing coders/decoders having general video communication functionalities such as processing and compressing/decompressing videos, or may comprise a separate coder/decoder layer that works in conjunction with existing coders/decoders. The installed modules at the source and the destination may be in continuous or regular communication; any detected tampering or external interference in the video communication may result in the source ceasing the transmission of the video stream. Tampering may include an external connection to alter a clock value, an attempt to copy packets of the video stream, attempts from a remote connection or another application on device 110 to access a portion of memory of device 110 that is designated for the video player, etc. At the beginning of the video communication session, device 114 may create a number of encryption keys with identifier sequence numbers and may transmit the set of encryption keys securely to device 110. The number of the keys can be based on past experience (e.g., the number of keys should be slightly over the number of private/PREO items expected).

When device 114 captures the video, device 114 may process the video to extract and obscure the "sensitive," or private ("PREO") items. For instance, device 114 may generate obscured version(s) of the item(s) and insert the obscured version(s) back into the video (replacing the original visual content). Alternatively, or in addition, the device 114 may replace the original visual content of the item(s) with obscured version(s) comprising replacement image(s), blank space, etc. The altered video may then be encrypted with a general encryption key for the video stream. In other words, the altered video may comprise the "main video stream."

In accordance with the present disclosure, sensitive/private items may be identified (such as by device 114) in a video in several ways. For instance, the video may not be a live stream, but may be recorded and/or stored. In this case, a user may use an application to select regions of the video (from one or more frames of the video) which may contain sensitive/private items. The application may then use the identified regions to detect the same items in additional frames of the video. For instance, the application may allow the user to draw a border around an object, such as a vehicle. Using the visual information of the vehicle, the application may then detect similar visual information in additional frames of the video to thereby identify the presence of the vehicle in subsequent frames. Device 114 may then obscure the vehicle in any such frames of the video in which the vehicle is detected.

Alternatively or in addition, a user of device 114 may provide inputs to identify one or more sensitive/private items that should be protected in the video. The inputs may comprise pictures or videos that are specific to the sensitive/private items, e.g., a picture of a face of a person that should be obscured for the transmission of the video to the destination device 110, a picture of a product prototype that should be obscured if detected in the video, etc. The input(s) may also comprise keywords, such as "eyes," "faces," "documents," "computer screens," etc. In one example, the inputs may be selected from a menu of suggested items.

To detect the sensitive/private items in the video, the device 114 may store visual information of various items that may be detected. This may include images of the various items, and may alternatively or additionally include feature sets derived from one or more images of each of the one or more items. For instance, for each item, device 114 may store a respective scale-invariant feature transform (SIFT) model, or a similar reduced feature set derived from image(s) of the item, which may be used for detecting the item in the video via feature matching. Thus, in one example, a feature matching detection algorithm employed by device 114 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for item/object detection and recognition may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features may be used to distinguish between a walking human, a moving car, a flying plane, etc. In one example, the device 114 may perform an image salience detection process, e.g., applying an image salience model and then performing an image recognition algorithm over the "salient" portion of the image(s). Thus, in one example, visual features may also include a length to width ratio of an object, a velocity of an object estimated from a sequence of images (e.g., video frames), and so forth. Similarly, in one example, the device 114 may apply an object detection and/or edge detection algorithm to identify possible unique items in the video (e.g., without particular knowledge of the type of item; for instance, the object/edge detection may identify an object in the shape of a car in a video frame, without understanding that the object/item is a car). In this case, visual features may also include the object/item shape, dimensions, and so forth.

In one example, the detection of items in the video may be performed in accordance with one or more machine learning algorithms (MLAs), e.g., one or more trained machine learning models (MLMs). For instance, a machine learning algorithm (MLA), or machine learning model (MLM) trained via a MLA may be for detecting a single item, or may be for detecting a single item from a plurality of possible items that may be detected via the MLA/MLM. For instance, the MLA (or the trained MLM) may comprise a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the item detection MLM(s) may be trained at a network-based processing system (e.g., server 116, DB 118 and/or AS 104, DB 106, etc.) and obtained by device 114. However, in another example, the device 114 may generate and deploy one or more MLMs for detecting one or more items.

Device 114 may also utilize one or more techniques to generate an obscured version of any detected sensitive/private items in the video. For instance, device 114 may apply a Gaussian blur to a portion of the video frame that is determined to contain and/or comprise the sensitive/private item (e.g., via edge/object detection and recognition as discussed above). In another example, device 114 may blank out the portion of the video frame, such as by changing the pixel values to correspond to black, or some other color. In still another example, device 114 may replace the portion of the video frame with a replacement image (such as generic eyes to replace the actual eye imagery of a person, an avatar to replace a human face, a generic image of a car that is in the public domain to replace actual imagery of a prototype motor vehicle, etc.). Additional or alternative video/image alteration techniques may also be applied by device 114, such as shadowing or shading, brightening (e.g., such as introducing an artificial light source), watermarking, censoring, etc.

Simultaneously, or substantially in parallel with the generating of the altered video (e.g., generating and/or modifying a frame thereof to contain obscured version(s) of one or more private/PREO items), the device 114 may maintain pure/original copies of any of the private/PREO items (the visual images thereof that are extracted from the captured video). Device 114 may then generate an executable package (e.g., comprising one or more packets) containing the private items. In particular, device 114 may encrypt the items using one of the PREO encryption keys that was created at the beginning of the video communication session. In one example, device 114 may also include the in the executable package instructions/code for execution by the receiver, e.g., device 110. In one example, the instructions/code is/are also encrypted with the selected encryption key. In another example, the instructions are not encrypted, but may be executed by device 110 to gain access to the item(s) that are encrypted.

To illustrate, at device 110, the executable package may be first decrypted via the selected encryption key to obtain unencrypted instructions/code for execution and unencrypted visual image(s) of the private item(s), e.g., the original items. In another example, the instructions/code may be unencrypted for transmission to device 110, in which case device 110 may execute the instructions/code to decrypt the image(s) of the private item(s) in accordance with the selected encryption key. In one example, device 110 may look at a sequence identifier and may use a previously received encryption key corresponding to that sequence number to decrypt any encrypted portions of the executable package. In addition, the instructions/code may be accessed and executed to cause the recipient device to replace the portions of the video with the obscured version(s) of the private item(s) with the actual/original imagery of the item(s). In one example, the obscured version of the item(s) within the main video stream may include information for the location(s) of the private item(s) from the decrypted executable package (e.g., the original items) within the original video so that device 110 can replace the obscured portions with the clear visual information. For instance, device 110 may arrange frames, GoPs, chunks, or other relevant units of the video/video stream in a buffer prior to rendering and display via a display component of device 110.

It should be noted that the foregoing describes just one illustrative example of how the system 100 may be used in connection with examples of the present disclosure for obscuring an item in a video stream that is encrypted with a first encryption key and generating an executable package comprising the item that is encrypted with a second encryption key. Thus, for instance, in another example, the system 100 may be used in connection with a video streaming session from device 114 to server 116. For instance, server 116 may receive an encrypted video feed from device 114 with sensitive items obscured, along with one or more encrypted executable packages to reconstruct and reinsert sensitive items back into the video feed. For example, server 116 may monitor a premises associated with the device 114 for detecting the presence of any unauthorized persons. To protect the biometric data and privacy of other individuals who may be present, the device 114 may detect and obscure all faces that may be present in the video feed. The faces may then be separately encrypted as executable packages and sent to server 116. Server 116 may decrypt and perform operations in accordance with the executable packages to reconstruct the original video stream. Then the server 116 may scan for known unauthorized persons. For instance, DB 118 may contain information regarding the faces of known unauthorized persons against which the server 116 may scan the video stream. Detections of known unauthorized persons may generate alerts, and relevant visual information from the video stream regarding these detections may be retained. For instance, the video stream may be stored at DB 118 for relevant record keeping purposes. However, sensitive biometric data (e.g., facial imagery) of other individuals may be released, and only the obscured versions of these items may be stored in the video stream. Thus, these and other illustrative uses of the system 100 may be provided in accordance with the present disclosure.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114 and server 116 may access network 102 via different access networks, devices 110 and 112 may access network 102 via different access networks, and so forth. Thus, these and other modifications are all contemplated within the scope of the present disclosure.

Figure 2:
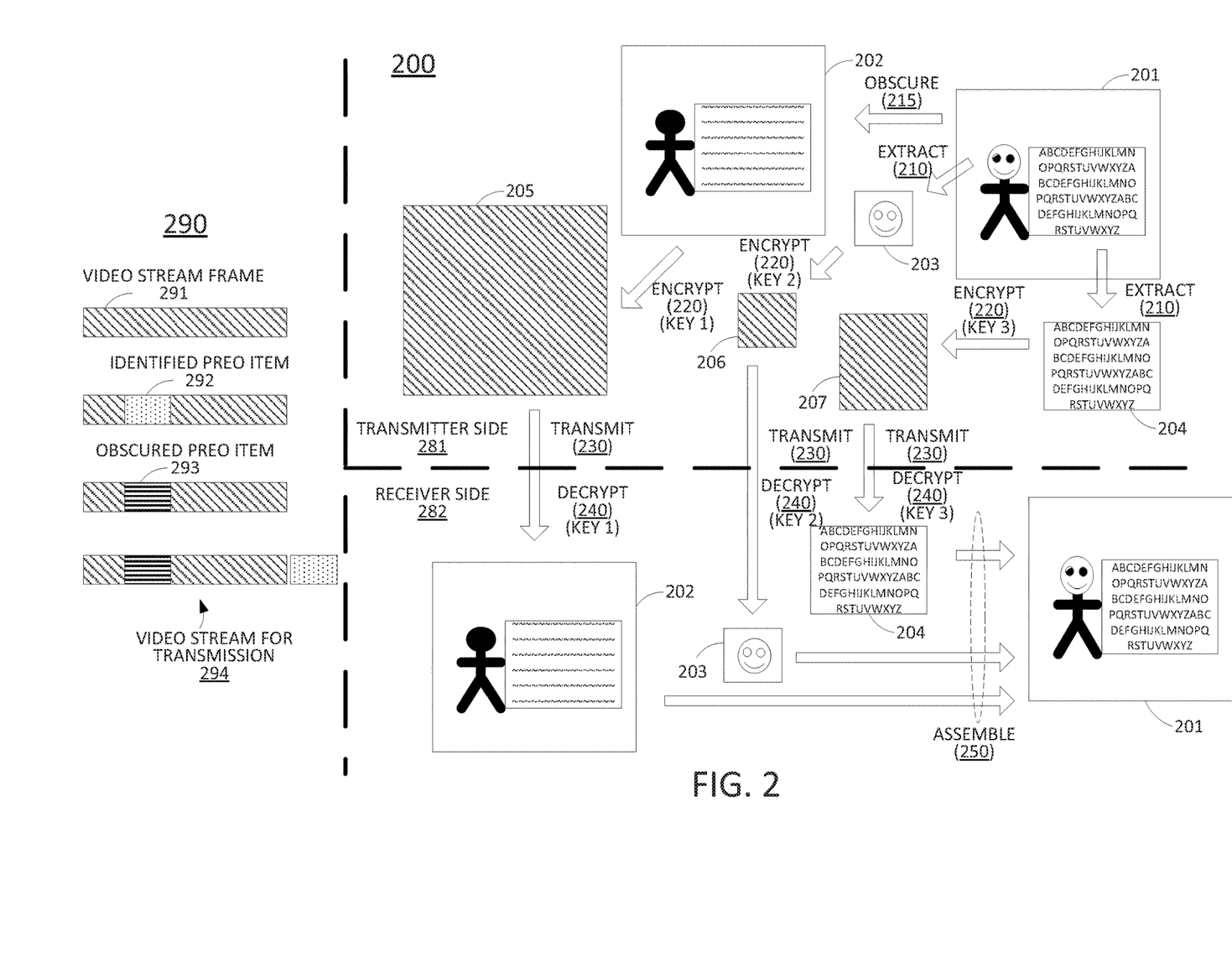
FIG. 2 illustrates example sequences of processing a frame of a video, in accordance with the present disclosure.

To further illustrate aspects of the present disclosure, FIG. 2 depicts an example sequence 200 of processing a frame of a video, e.g., frame 201. The sequence 200 includes operations or "stages" on a transmitter side 281 as well as operations/stages on a receiver side 282. At stage 210, a source device (e.g., a video server, a video capture device, such as a mobile computing device having a camera, etc.), may extract sensitive items from the frame 201. For instance, a user's face 203 may be detected in the frame 201. In addition, a document 204 may be detected in the frame 201, where both of these types of items are designated as PREO/private items (e.g., "sensitive" items). At stage 215, the source device may obscure the sensitive items in the frame 201 to generate a modified frame 202. For instance, as shown in FIG. 2, the modified frame 202 includes a blurred document and a silhouetted face, such that the details of the face 203 and the document 204 are not discernable. At stage 220, the source device may encrypt the sensitive items. In one example, different encryption keys are used for the respective sensitive items, e.g., key 2 for the eyes 203 and key 3 for the document 204. In one example, the sensitive items are encrypted as executable packages with instructions for reassembly with the modified frame 202, countdown timer(s), etc. The result is the generation of encrypted executable packages 206 and 207. At stage 220, the source device may also encrypt the modified frame 202 with a general encryption key for the video stream (e.g., key 1) to generate an encrypted frame 205. Thereafter, at stage 230, the source device may transmit the encrypted frame 205 and the encrypted executable packages 206 and 207 to a destination device.

Upon receiving the encrypted frame 205 and the encrypted executable packages 206 and 207, the destination device may perform operations on the receiver side 282. For instance, at stage 240, the destination device may decrypt the encrypted frame 205 and the encrypted executable packages 206 and 207 using the respective decryption keys (e.g., key 1, key 2, and key 3, respectively). It should be noted that the key 1, key 2, and key 3 may be identical to the key 1, key 2, and key 3 utilized for encryption at stage 220 on the transmitter side 281. However, in another example, key 1, key 2, and key 3 on the receiver side 282 may comprise different keys that are complementary to the key 1, key 2, and key 3 of the transmitter side 281. For instance, the keys may be established in accordance with asymmetric public key technology. In any case, the decrypting of stage 240 may provide the modified frame 202 as well as the original images of the face 203 and the document 204 (e.g., the executable packages containing the face 203 and the document 204).

At stage 250, the destination device may assemble the modified frame 202 as well as the original images of the face 203 and the document 204, e.g., in accordance with the instructions/code of the respective executable packages. For instance, the assembling may result in the reconstruction of the original frame 201. The destination device may then buffer and/or display the frame 201. In addition, after a countdown timer expires, the destination device may release, overwrite, delete, or otherwise dispose of the imagery of the face 203 and the document 204 and/or the executable packages associated therewith. As such, any information regarding frame 201 that may be retained at the destination device may comprise nothing more than what is contained in the modified frame 202.

To further illustrate aspects of the present disclosure, FIG. 2 also depicts an example sequence 290 of processing a frame of a video, e.g., video stream frame 291. For instance, the sequence 290 may relate to operations performed by a source device to prepare the video stream frame 291 for transmission to a destination device. In the present example, the video stream frame 291 may comprise a bit stream. The source device may first identify a private/PREO item 292 within the video stream frame 291, which may comprise a portion of the bit stream as illustrated. In addition, the source device may then obscure the private/PREO item 292, e.g., by replacing the portion of the bit stream with the obscured PREO item 293. The video stream frame 291 with the obscured PREO item 293 may then be encrypted using a whole video stream general encryption key. Finally, the source device may place the PREO item 292 following the video stream frame 291 to provide the video stream for transmission 294. For instance, the identified PREO item 292 may be included as an executable file, or an executable package, encrypted by one of the unique PREO encryption keys. Thus, the executable package with the identified PREO item 292 may be appended to the end of the video stream frame 291. The executable package may also include a sequence number to tell the destination device which PREO encryption key should be used to decrypt. In addition, the executable package may include a timestamp and maximum lifespan.

In one example, a code may also be inserted with the obscured PREO item 293 to inform the destination device that the obscured PREO item 293 is present, and to inform of the size of the obscured PREO item 293 (e.g., the number of bits, bytes, etc.). For instance, the obscured PREO item 293 may contain information for the location of the executable package bits for the identified PREO item 292 next to the modified video stream frame 291 such that the destination device can replace the obscured PREO item 293 with the clear picture (decrypted PREO package comprising the identified PREO item 292). In this way, the destination device can replace the obscured PREO item 293 with the identified PREO item 292. In one example, error checksum and other packet integrity mechanisms may be reviewed and adjusted by the source device to account for the changed bits associated with the obscured PREO item 293.

A device attacking the video stream may attempt to decrypt the video stream frame 291. If the attacking device possesses the general encryption key for the video stream, this may be possible. However, this may only provide access to the obscured PREO item 293. The clear, identified PREO item 292 will not be decrypted. For instance, the encrypted executable package comprising PREO item 292 (encrypted with a different PREO encryption key) may be handled as a malformed packet by the attacking device, since the attacking device cannot decrypt this data.

On the other hand, the intended destination device may decrypt and decode the video stream frame 291 (e.g., comprising one or more packets) and may find the identifier code for the obscured PREO item 293. Thus, the destination device may know that there is a PREO executable package that follows the main video stream frame 291. In one example, the destination device may delete bits associated with the obscured PREO item 293 (e.g., where the number of bits is given and identified with the obscured PREO item 293). In addition, the destination device may expect the executable package with the original identified PREO item 292, and may decrypt the executable package using a pre-shared PREO encryption key that may be selected based on an embedded sequence code that identifies which PREO encryption key to use for this particular executable package. The destination device may then replace the obscured PREO item 293 with the decrypted, original identified PREO item 292 and deliver the reconstructed original video stream frame 291, e.g., for presentation via a display, for use in an authentication or authorization action, etc.

FIG. 3 illustrates a flowchart of an example method 300 for obscuring an item in a video stream that is encrypted with a first encryption key and generating an executable package comprising the item that is encrypted with a second encryption key, in accordance with the present disclosure. In one example, the method 300 is performed by a component of the system 100 of FIG. 1, such as by one of devices 110, 112, or 114, the server 116, application server 104, and/or any one or more components thereof (e.g., a processor, or processors, performing operations stored in and loaded from a memory), by a plurality of the devices 110, 112, or 114, server 116, application server 104, or by any one or more of such devices in conjunction with one or more other devices, such as DB 106, DB 118, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system obtains at least a portion of a video stream. The portion of the video stream may comprise a frame, a chunk, a group of pictures (GoP), or the like. For instance, in one example, the processing system may comprise a device with video capture capabilities, e.g., a digital video camera, a smartphone or tablet computer with a camera, a wearable computing device (such as smart glasses), a security camera, or a processing system comprising a security camera, and so forth. In another example, the processing system may comprise a video server that securely stores one or more videos and that may provide such video(s) to requesting devices, e.g., in accordance with the present method 300 and/or as described additionally herein. For instance, the portion of the video stream may be obtained from a security camera, e.g., a camera to obtain video of a location and to provide the video to a storage server, such as a video archiving system, and/or a monitoring station, etc. In one example, the recipient device may further comprise an access authorization system. In another example, the portion of the video stream may be obtained from a camera of a first participant in a video call (e.g., where a recipient device of the video stream may be associated with a second participant in the video call). It should be noted that the portion of the video/video stream may comprise all or at least a part of the video, or video stream. In addition, the portion may be the beginning of the video stream, an intermediate part of the video stream, and so forth.

At optional step 320, the processing system may provide information of at least a "second" encryption key to a recipient device. For instance, the information for a second encryption key may be for decrypting (and/or encrypting) a sensitive/private item (e.g., a PREO item). In one example, the processing system may send information pertaining to a set of keys to the recipient device for use in decrypting various executable packages for sensitive/private item, as described herein. For instance, different keys may be used for different executable packages relating to the same item, but in different frames, chunks, or other units of the video stream, and/or for different packages for different items, such as one key for documents, one key for facial data, etc. In one example, the information for at least the second encryption key may comprise the one or more actual keys, or may comprise a complementary key, or keys associated with at least the second encryption key (e.g., in the case of asymmetric cryptographic keys). In one example, the information may comprise a private key portion that may be combined with a public key to enable a decryption of an executable package containing a sensitive/private item of the video stream. In one example, optional step 320 may also include providing information for one or more encryption keys for the overall video stream, e.g., including information regarding at least a "first" encryption key.

At optional step 330, the processing system obtains a user input identifying one or more items that are designated for obscuring in the video stream. For instance, as described above, a user may select item(s) from a list, may provide sample image(s) of one or more items, and so forth.

At step 340, the processing system identifies a first region of the portion of the video stream that contains a first item that is designated for obscuring. For instance, the processing system may extract or identify various visual features from the portion of the video stream, which may include low-level invariant image data, such as colors, shapes, color moments, color histograms, edge distribution histograms, movement in the video, including changes between frames in a sequence, and so forth. In one example, the features may be the types of features that may be used for object detection/recognition in accordance with a SURF features-based object detection algorithm, a SIFT features-based object detection algorithm, etc. In this regard, step 340 may comprise applying the extracted features from the portion of the video to one or more trained MLMs for detecting one or more items within the portion of the video stream. In one example, the processing system may store trained models for detecting the various items/objects. In one example, the processing system may generate the trained models, e.g., in accordance with a set of input data comprising sample images of relevant items/objects. In another example, the processing system may obtain the detection models from another processing system. The first item that is detected may comprise, for example, one of: a person or a portion thereof, such as a face, an eye, or pair of eyes, etc., a document, a computer screen or other display screen, a product prototype, and so forth.

At optional step 350, the processing system may generate an obscured version of the first item. For example, the processing system may generate a pixelated version of the first item with a lower resolution than the first item in the first region of the video stream. In another example, the processing system may generate a blurred version of the first item. For example, the processing system may apply a blurring technique, such as Gaussian blur, to the first region of the portion of the video stream containing the first item. In another example, the obscured version of the first item may comprise a silhouetted version of the first image or a replacement image, and so forth.

At step 360, the processing system replaces the first item in the first region of the portion of the video stream with an obscured version of the first item. For example, the processing system may overwrite a portion of a bitstream corresponding to the first region of the portion of the video stream with the obscured version of the first item (which in one example, may be generated at optional step 350).

At step 370, the processing system encrypts the portion of the video stream with a first encryption key. For instance, the first encryption key may be a key for the encryption of the overall video stream, or at least the portion thereof.

At step 380, the processing system generates an executable package comprising the first item in the first region of the portion of the video, where the executable package is encrypted with a second encryption key. In one example, the second encryption key may be one of a plurality of encryption keys for use in connection with an obscuring of one or more items in the video stream. In one example, information regarding the second encryption key and/or the set of encryption keys may be provided to a recipient device at optional step 320. In one example, the executable package includes a first portion that is encrypted with the second encryption key and a second unencrypted portion that comprises an indication of the second encryption key for use in decrypting the first portion. For instance, the indication may comprise a sequence number that identifies the second encryption key from the set of encryption keys that should be used by the recipient device to decrypt the executable package.

In one example, the executable package includes visual information of the first item. In addition, in one example, the executable package includes an indicator of the location of the first region of the portion of the video. However, in another example, the portion of the video stream that is encrypted with the first encryption key may be transmitted with an indicator of the location of the first region of the portion of the video. In one example, the executable file comprises a script that is executable by a video player application of the recipient device. For instance, the executable package may comprise instructions which, when executed by the recipient device, cause the recipient device to present the first item in the first region of the portion of the video instead of the obscured version of the first item.

In one example, the executable package further comprises instructions which, when executed by the recipient device, cause the recipient device to store the portion of the video with the obscured version of the first item in the first region following an expiration of a countdown timer of the executable package. For example, the countdown timer may be set by the processing system and may be included in the executable package that is transmitted. In one example, a duration of the countdown timer is set based upon a calculated network transit time and a calculated processing time at the recipient device.

At step 390, the processing system transmits the portion of the video stream that is encrypted with the first encryption key and the executable package that is encrypted with the second encryption key to the recipient device. The recipient device may then decrypt the portion of the video stream in accordance with the first encryption key and may decrypt the executable package in accordance with the second encryption key. For example, the recipient device may first check whether there is an obscured item in the portion of the video by scanning for a specific indicator in the portion of the video that is encrypted with the first encryption key. In another example, the recipient device may always check for one or more executable packages following a portion of the video (e.g., following each frame and/or each chunk, etc.).

In one example, the executable package may include an indication of the decryption key to use to decrypt the executable package (which may already be provided to the recipient device). As noted above, the (decrypted) executable package may include an indication as to the region where the item belongs in the portion of the video. As such, the recipient device may replace the obscured version of the item with the original version of the item contained in the executable package (and in accordance with the executable instructions/code thereof). In one example, the recipient device may store the portion of the video stream, but may revert to the obscured version of the item in accordance with a countdown timer provided in the executable package (and in accordance with the executable instructions/code thereof). In one example, the recipient device may release and/or overwrite any portion of a memory of the recipient device which may contain the original item (e.g., the visual information thereof) and/or the executable package as a whole. Storing in this manner can be in memory, or can be in storage (if the recipient device is also for storing/recording the video). In one example, the recipient device may store the portion of the video stream in memory, e.g., temporarily to allow rewinding of the video and to permit replay, for example. In such case, the original presentation of the portion of the video stream may show the true image of the item, while subsequent playback such as using a rewind feature may result in the obscured version of the item only being available.

At step 395 the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 to continue processing additional portions of the video stream, and so on. In one example, optional step 320 may be performed before obtaining the portion of the video stream. In another example, optional step 320 may be performed after generating the executable package at step 380, and so forth. In another example, the generating of the executable package and the encrypting of the executable package at step 380 may comprise separate steps. In one example, the method 300 may be expanded to include transmitting the portion of the video stream that is encrypted with the first encryption key and the executable package that is encrypted with the second encryption key to multiple intended recipient devices, such as several participants in a video conference call.

In one example, the method 300 may include sending the portion of the video stream that is encrypted with the first encryption key to other recipient devices, without sending the executable package that is encrypted with the second encryption key to such other recipient devices. For instance, a user may prefer that one or several participants in a video conference call may receive a true representation of all imagery in the video stream, while one or more other participants may be designated to receive a version of the video stream that only includes obscured versions of the first item and/or one or more additional sensitive/private items. In still another example, the portion of the video stream that is encrypted with the first encryption key may be sent to a storage server without sending the executable package that is encrypted with the second encryption key. For instance, one or more other participants in a video call (e.g., at least one of whom is associated with the recipient device) may obtain the original imagery of the video stream, while a storage server may archive the video stream in a modified format with obscured version(s) of the first item and/or various other items in the video stream. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for obscuring an item in a video stream that is encrypted with a first encryption key and generating an executable package comprising the item that is encrypted with a second encryption key, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for obscuring an item in a video stream that is encrypted with a first encryption key and generating an executable package comprising the item that is encrypted with a second encryption key (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for obscuring an item in a video stream that is encrypted with a first encryption key and generating an executable package comprising the item that is encrypted with a second encryption key (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, a portion of a video stream;
   identifying, by the processing system, a first region of the portion of the video stream that contains a first item that is designated for obscuring;
   replacing, by the processing system, the first item in the first region of the portion of the video stream with an obscured version of the first item;
   encrypting, by the processing system, the portion of the video stream having the obscured version of the first item with a first encryption key;
   generating, by the processing system, an executable package comprising the first item, wherein the executable package is encrypted with a second encryption key, wherein the executable package comprises a script that is executable by a video player application of a recipient device, wherein the video player application is configured to obtain the first item from the executable package and to replace the obscured version of the first item in the first region with the first item that is obtained from the executable package; and
   transmitting, by the processing system, the portion of the video stream that is encrypted with the first encryption key and the executable package that is encrypted with the second encryption key to the recipient device.

2. The method of claim 1, further comprising:
   generating the obscured version of the first item.

3. The method of claim 1, wherein the obscured version of the first item comprises:
   a pixelated version of the first item with a lower resolution than the first item in the first region of the video stream;
   a blurred version of the first item;
   a silhouetted version of the first image; or
   a replacement image.

4. The method of claim 1, wherein the portion of the video stream comprises:
   a frame;
   a group of pictures; or
   a chunk.

5. The method of claim 1, wherein the recipient device comprises:
   a video monitoring device; or
   a video archive system.

6. The method of claim 5, wherein the recipient device further comprises an access authorization system.

7. The method of claim 1, wherein the portion of the video stream is obtained from a security camera.

8. The method of claim 1, wherein the portion of the video stream is obtained from a camera of a first participant in a video call, wherein the recipient device is associated with a second participant in the video call.

9. The method of claim 1, wherein the portion of the video stream that is encrypted with the first encryption key is transmitted with an indicator of a location of the first region of the portion of the video stream.

10. The method of claim 1, wherein the executable package includes an indicator of a location of the first region of the portion of the video stream.

11. The method of claim 1, wherein the executable package includes visual information of the first item.

12. The method of claim 1, wherein the first item comprises:
    a face;
    an eye;
    a document; or
    a display screen.

13. The method of claim 1, wherein the executable package comprises instructions which, when executed by the recipient device, cause the recipient device to present the first item in the first region of the portion of the video stream instead of the obscured version of the first item.

14. The method of claim 13, wherein the executable package further comprises instructions which, when executed by the recipient device, cause the recipient device to store the portion of the video stream with the obscured version of the first item in the first region following an expiration of a countdown timer of the executable package.

15. The method of claim 1, further comprising:
    providing information of the second encryption key to the recipient device.

16. The method of claim 15, wherein the second encryption key is one of a plurality of encryption keys for use in connection with an obscuring of one or more items in the video stream.

17. The method of claim 16, wherein the executable package includes a first portion that is encrypted with the second encryption key and a second unencrypted portion that comprises an indication of the second encryption key for use in decrypting the first portion.

18. A non-transitory computer-readable medium storing instructions which, when executed by a processing system including at least one processor, cause the processing system to perform operations, the operations comprising:

obtaining a portion of a video stream;

identifying a first region of the portion of the video stream that contains a first item that is designated for obscuring;

replacing the first item in the first region of the portion of the video stream with an obscured version of the first item;

encrypting the portion of the video stream having the obscured version of the first item with a first encryption key;

generating an executable package comprising the first item, wherein the executable package is encrypted with a second encryption key, wherein the executable package comprises a script that is executable by a video player application of a recipient device, wherein the video player application is configured to obtain the first item from the executable package and to replace the obscured version of the first item in the first region with the first item that is obtained from the executable package; and transmitting the portion of the video stream that is encrypted with the first encryption key and the executable package that is encrypted with the second encryption key to the recipient device.

19. An apparatus comprising:

a processing system including at least one processor; and a computer-readable medium storing instructions which, when executed by the processing system, cause the processing system to perform operations, the operations comprising:

obtaining a portion of a video stream;

identifying a first region of the portion of the video stream that contains a first item that is designated for obscuring;

replacing the first item in the first region of the portion of the video stream with an obscured version of the first item;

encrypting the portion of the video stream having the obscured version of the first item with a first encryption key;

generating an executable package comprising the first item, wherein the executable package is encrypted with a second encryption key, wherein the executable package comprises a script that is executable by a video player application of a recipient device, wherein the video player application is configured to obtain the first item from the executable package and to replace the obscured version of the first item in the first region with the first item that is obtained from the executable package; and transmitting the portion of the video stream that is encrypted with the first encryption key and the executable package that is encrypted with the second encryption key to the recipient device.

20. The apparatus of claim 19, wherein the operations further comprise:

generating the obscured version of the first item.

* * * * *